Figure 6:
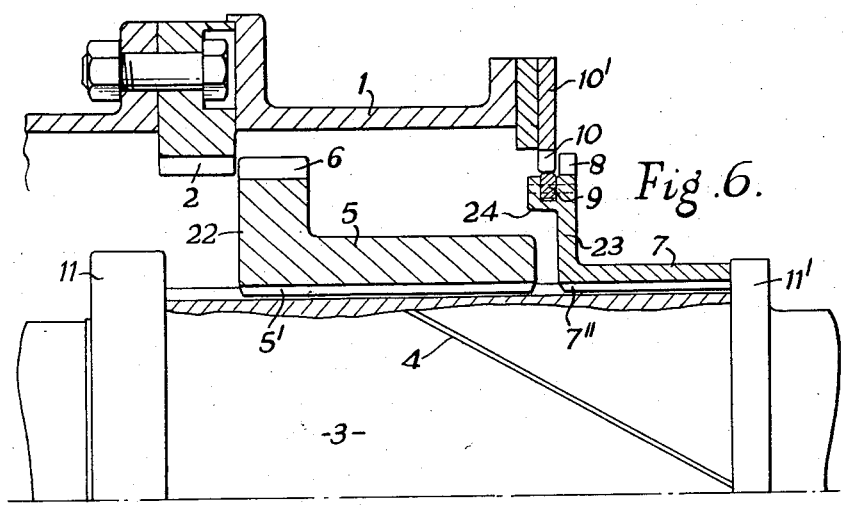

Feb. 21, 1961　　　　H. SINCLAIR　　　　2,972,397
SYNCHRONOUS SELF-SHIFTING CLUTCHES
Filed Aug. 1, 1957　　　　　　　　　　　　4 Sheets-Sheet 1
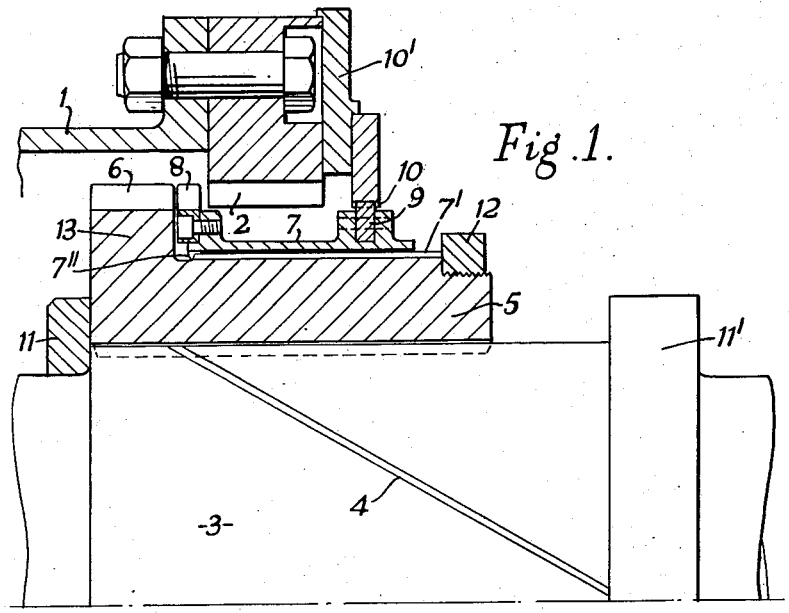
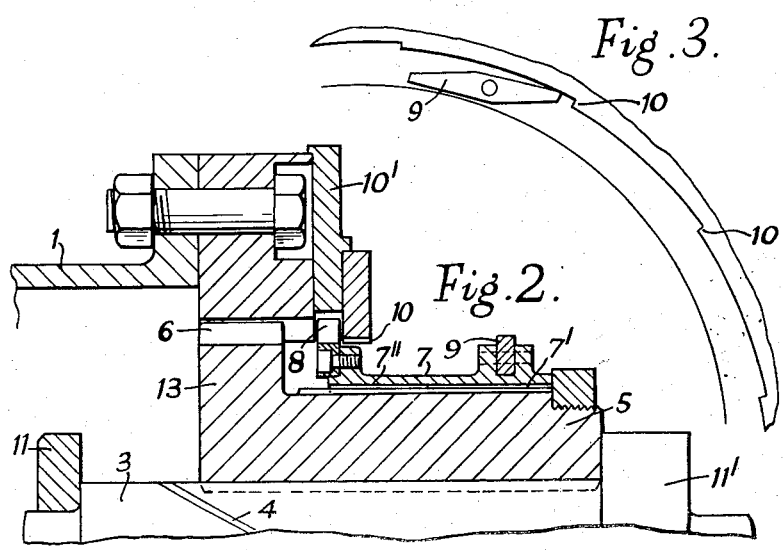
INVENTOR
HAROLD SINCLAIR
BY
Benjamin Sweedler
ATTORNEY

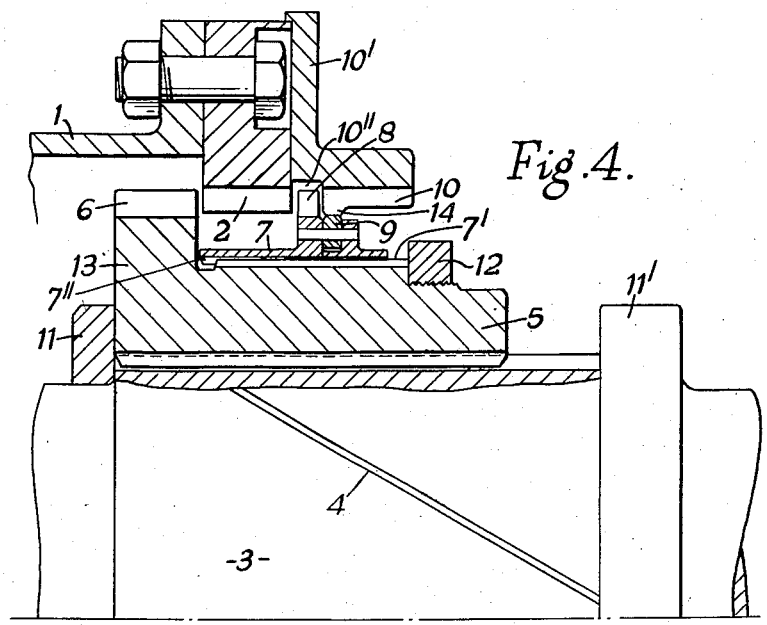
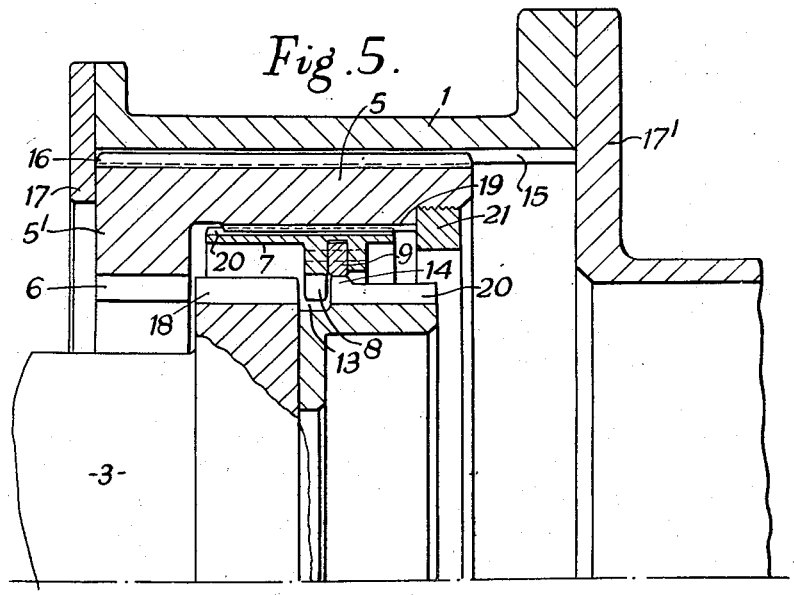

Feb. 21, 1961  H. SINCLAIR  2,972,397
SYNCHRONOUS SELF-SHIFTING CLUTCHES
Filed Aug. 1, 1957  4 Sheets-Sheet 3

INVENTOR
HAROLD SINCLAIR
BY
Benjamin Sweedler
ATTORNEY

United States Patent Office 2,972,397
Patented Feb. 21, 1961

2,972,397
SYNCHRONOUS SELF-SHIFTING CLUTCHES
Harold Sinclair, Windsor, England
(5 Phillimore Gardens Close, London W.8, England)
Filed Aug. 1, 1957, Ser. No. 675,743
Claims priority, application Great Britain Oct. 4, 1956
10 Claims. (Cl. 192—67)

This invention relates to clutches for transmitting rotary motion, of the synchronous self-shifting type comprising first and second clutch members which are arranged coaxially and the first of which is provided with jaw clutch teeth and on the second of which members is mounted an intermediate member which is provided with jaw clutch teeth and which is movable helically relative to the second clutch member into and out of toothed engagement with the first clutch member. The most common means employed in such clutches for the purpose of engaging the clutch is a ratchet mechanism that comprises one or more pawls, the noses of which move in a radial sense, carried by the intermediate or the first member. In the over-running or free wheeling condition of the clutch, the noses of the pawls ratchet under or over projections on the member which does not carry the pawls, i.e. either the first or the intermediate member, said projections being, for example, the clutch teeth on the member in question or a separate ring of ratchet teeth carried by the said member. When the sense of relative angular movement between the first and second members is in the direction for effecting clutch engagement, the pawl or one of the pawls of the said ratchet mechanism is or are picked up by one of the said projections, in which condition the teeth of the intermediate member are precisely aligned with the teeth of the first clutch member, and the intermediate member is thereby caused to move helically on the second clutch member whereby to bring its teeth into clean interengagement with the teeth of the first clutch member.

An object of the present invention is to provide a clutch of the type referred to which is suitable for use when the said intermediate member is necessarily of high inertia. A further object is to use ratchet mechanism of relatively small size and light weight, suitable for ratcheting at relatively high speeds.

A clutch according to the present invention comprises coaxially mounted first and second clutch members the first of which is provided with jaw clutch teeth and the second of which has mounted on it an intermediate member provided with jaw clutch teeth, the intermediate member being constrained for helical movement relative to the second clutch member whereby to bring clutch teeth of the intermediate member into and out of toothed engagement with the clutch teeth of the first clutch member, and the clutch is characterised by an auxiliary member for initiating the toothed engagement of the intermediate member with the first clutch member, said auxiliary member being capable of limited helical movement relative to said intermediate member, and a ratchet mechanism associated with said auxiliary member for initiating the helical movement of said auxiliary member to initiate the toothed engagement of said intermediate member and said first clutch member.

Figure 7:
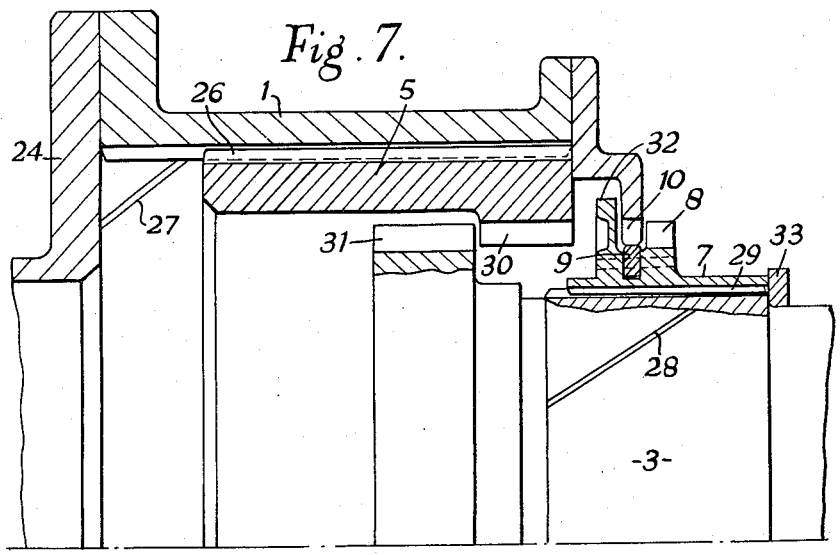
Figure 8:
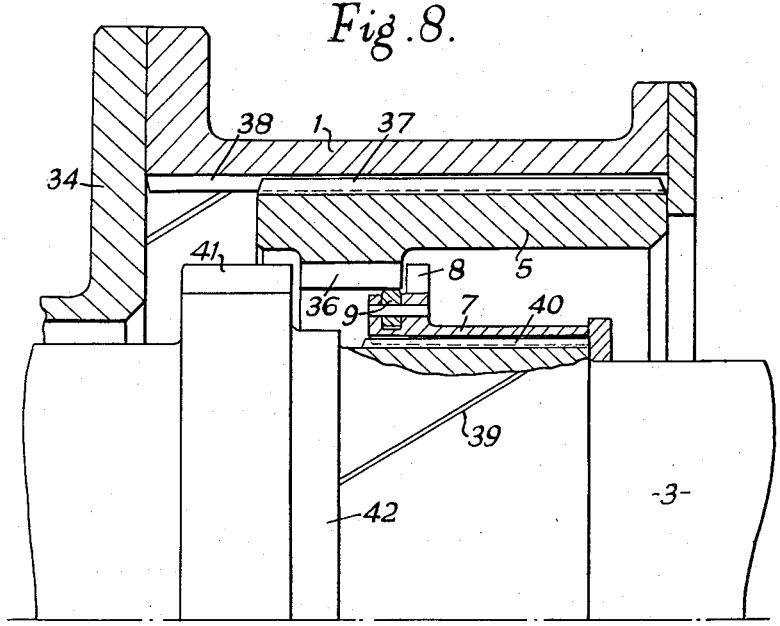

In order that the invention may be clearly understood and readily carried into effect some embodiments thereof will now be described by way of example, with reference to the accompanying drawings, in which:

Fig. 1 is a view in longitudinal section of a clutch in which the intermediate member is mounted externally on one clutch member and the auxiliary member is mounted externally on the intermediate member, the clutch being shown disengaged, Fig. 2 is a view showing the clutch of Fig. 1 in the engaged condition, Fig. 3 is an enlarged view of part of the ratchet mechanism of the clutch according to Figs. 1 and 2, Fig. 4 shows another clutch in which the intermediate member is mounted externally on a clutch member and the auxiliary member is mounted externally on the intermediate member, Fig. 5 shows a clutch in which the intermediate member is within a clutch member and the auxiliary member is disposed within the intermediate member, Fig. 6 shows a clutch in which the intermediate members are mounted externally on the same clutch member, Fig. 7 shows a clutch in which the intermediate member is carried by one clutch member and the auxiliary member is carried by the other clutch member, and Fig. 8 shows another clutch in which the intermediate member is carried by one clutch member and the auxiliary member is carried by the other clutch member, and in which the clutch teeth of one clutch member also serve as ratchet teeth.

Referring to Figures 1, 2 and 3 the first clutch member 1 is provided with a ring of wide internal jaw clutch teeth 2 and the second clutch member is a shaft 3 which is coaxial with the first clutch member 1 and is provided with external right handed helical splines 4. The intermediate member 5 is mounted on the shaft 3 and is formed with internal helical splines which are engaged with the helical splines 4 on the shaft 3, whereby the intermediate member 5 is constrained for helical movement on the shaft 3. The intermediate member 5 is provided with a ring of wide external jaw clutch teeth 6 capable of engagement with the internal teeth 2 of the first clutch member 1. On the intermediate member is mounted an auxiliary member 7 which is constrained to move helically on the intermediate member 5 by virtue of interengaging helical splines 7' formed on the intermediate member 5 and splines 7" are formed in the auxiliary member 7, the helical splines 7' and 7" being right handed, i.e., of the same hand as those in the intermediate member 5 and on the shaft 3. The auxiliary member 7 is provided with a ring of narrow teeth 8, and with a plurality of pawls 9 that, in the disengaged condition of the clutch (Fig. 1) have their noses in the path of a ring of narrow auxiliary internal teeth 10 formed on a ring 10' fixed to the first clutch member 1. The pawls 9 and the teeth 8 on the auxiliary member 7 are at opposite ends of the auxiliary member 7. The teeth 8 of the auxiliary member 7 are situated at the end of the auxiliary member 7 nearest to the clutch teeth 6 of the intermediate member 5. The adjacent end faces of the teeth 2 and 8 have hardened flat surfaces suitable for sliding over each other when in contact prior to their interengagement. The movement of the intermediate member 5 on the shaft is limited by axial stops 11 and 11' on the shaft.

The operation of the clutch is as follows:

While the direction of relative rotation between the first and second clutch members 1 and 3 is in one sense, the intermediate member 5 has its clutch teeth 6 out of engagement with the clutch teeth 2 of the clutch member 1 and abuts against the axial stop 11. The teeth 8 of the auxiliary member 7 are also out of engagement with the clutch teeth 2 of the clutch member 1 and are disposed, in the axial sense, between the clutch teeth 2 of the clutch member 1 and the clutch teeth 6 of the intermediate member. In this condition of the clutch, shown in Fig. 1, the pawls 9 on the auxiliary member 7 ratchet with respect to the auxiliary teeth 10 of the clutch member 1.

When synchronism is reached between the first and second clutch members 1 and 3, and the direction of relative rotation between them tends to reverse, engagement occurs between a pawl 9 (or a pair of diametrically opposite pawls) and one of the auxiliary teeth 10 of the clutch member 1 (or a pair of diametrically opposite teeth). The auxiliary member 7 is thereby caused to move helically to the right along the intermediate member 5 against the axial stop 12.

During this helical movement of the auxiliary member 7, the teeth 8 thereon are brought precisely into interengagement with the internal clutch teeth 2 of the clutch member 1, and the pawls 9 have moved axially out of the path of the auxiliary teeth 10 of the clutch member 1. Due to interengagement of the teeth 8 and 2 and the abutment of the auxiliary member 7 against the axial stop 12 the intermediate member 5 is now moved helically along the shaft 1 so as to bring its clutch teeth 6 into precise engagement with the clutch teeth 2 of the clutch member 1. When the movement of the intermediate member 5 is arrested by the axial stop 11' on the shaft 1, the clutch teeth 2 of the clutch member 1 and the clutch teeth 6 of the intermediate member 5 are in full engagement, and the teeth 8 on the auxiliary member 7 have moved axially out of engagement with the clutch teeth 2 of the clutch member 1. The clutch is now fully engaged, as shown in Fig. 2, for the transmission of torque between the first and second clutch members 1 and 3 via the clutch teeth 2 and 6.

When the direction of relative rotation between the first and second clutch members again reverses, the first effect is that the intermediate member 5 is screwed along the shaft 3 so as to bring its teeth 6 out of engagement with the clutch teeth 2 of the clutch member 1. This movement continues until the two sets of clutch teeth 2 and 6 are disengaged. At this stage interengagement of the teeth 8 of the auxiliary member 7 with the clutch teeth 2 of the clutch member 1 causes the auxiliary member 7 to be screwed along the intermediate member until it abuts a flange 13 on the latter, whereupon during the continued movement of the auxiliary member 7 with respect to the shaft 3 the intermediate member 5 is pushed by the auxiliary member 7, and the auxiliary and intermediate members 7 and 5 move together until the intermediate member 5 abuts against the axial stop 11 on the shaft 3. At this stage the teeth 8 of the auxiliary member 7 have become disengaged from the clutch teeth 2 of the clutch member 1, and the pawls 9 on the auxiliary member 7 have come into the path of the auxiliary teeth 10 on the clutch member 1. The clutch is now in the condition originally described, and as shown in Fig. 1.

The principal advantages of providing a separate ring of ratchet teeth 10 for co-operation with the pawls 9, instead of the previously known practice of having pawls that ratchet under the clutch teeth 2 are that the teeth 10 can be of the most favourable form for smoothness of ratchetting as shown by Fig. 3, with the operative surfaces of the teeth 10 and the pawls 9 arranged on substantially radial planes of the clutch. Also the pawls can be smaller and lighter in weight and easier to manufacture than is the case if the pawls have to be in ratchetting engagement with the clutch teeth 2 that are of normal form and large enough to transmit the full load torque.

Referring to Fig. 4, the intermediate member 5 is helically movable on a shaft 3, by virtue of co-acting right-handed splines in the intermediate member 5 and right-handed splines 4 on the shaft 3, the latter constituting the second clutch member. The first clutch member 1 is provided with a ring of wide jaw clutch teeth 2 which in the disengaged condition of the clutch (as shown) are slightly axially spaced from the jaw clutch teeth 6 of the intermediate member 5. An auxiliary member 7 is mounted for helical movement on the intermediate member 5, by virtue of co-acting right-handed helical splines 7' on the intermediate member 5 and splines 7" in the auxiliary member 7. The auxiliary member 7 has a ring of narrow teeth 8 which in the disengaged condition of the clutch as shown are situated in an annular groove 10" between the jaw clutch teeth 2 and a ring of wide auxiliary teeth 10 on a ring 10' carried by the clutch member 1. The said auxiliary teeth 10 are capable of interengagement with the teeth 8 of the auxiliary member 7, and the auxiliary teeth 10 are, as illustrated, of increased height over a portion of their width adjacent the annular groove 10", so as to provide ratchet teeth 14 which co-operate with a ring of pawls 9 carried by the auxiliary member 7.

The clutch is disengaged during relative rotation in one direction between the first and second clutch members 1 and 3, the intermediate member 5 being adjacent to an axial stop 11 on the clutch member 3 and the auxiliary member 7 being adjacent to a flange 13 on the intermediate member on which the teeth 6 are formed, and the pawls 9 ratchet past the ratchet teeth 14.

When the relative motion between the first and second clutch members tends to reverse the first effect is that a pawl 9 (or two diametrically opposite pawls) is picked up by a ratchet tooth 14, whereby the auxiliary member 7 is screwed along the intermediate member 5, in the direction to the right in Figure 4, to bring the teeth 8 on the auxiliary member 7 into engagement with the ratchet teeth 14. When the teeth 8 have become fully engaged with the ratchet teeth 14, the pawl 9 (or pawls) has moved axially out of engagement with the ratchet tooth 14 by which it was picked up, and the auxiliary member 7 now abuts against an axial stop 12 on the intermediate member 5, and the interaction of the ratchet teeth 14 and the teeth 8 of the auxiliary member 7 now causes the intermediate member 5 to screw along the shaft 3, to the right in the figure. During the initial part of this movement of the intermediate member 5, engagement of the clutch teeth 6 on the intermediate member 5 with the clutch teeth 2 on the clutch member 1 is initiated, and thereafter the interaction of the two sets of clutch teeth 6 and 2 causes the intermediate member 5 to move along the shaft 3 until the clutch teeth 6 and 2 are in full engagement, at which point the intermediate member 5 abuts against a further axial stop 11' on the shaft 3. During this movement of the intermediate member 5 the auxiliary member 7 moves with it, the teeth 8 of the auxiliary member 7 moving axially out of engagement with the ratchet teeth 14 but remaining in engagement with the auxiliary teeth 10, that are of less height than the ratchet teeth. The clutch is now in the engaged condition.

When the first and second clutch members again have relative rotation in the original direction, the interaction of the two sets of clutch teeth 2 and 6 causes the intermediate member 5 to move along the shaft 3 to the left until the clutch teeth 6 on the intermediate member 5 have disengaged from the clutch teeth 2 of the clutch member 1, at which stage the intermediate member 5 abuts the axial stop 11. During this movement the stop 12 pushes the auxiliary member 7 axially to the left. When the intermediate member 5 has come into contact with the stop 11, the teeth 8 of the auxiliary member 7 are in engagement with the ratchet teeth 14, and the interaction between the teeth 8 and the ratchet teeth 14 causes the auxiliary member 7 to screw to the left along the intermediate member 5 so as to bring the teeth 8 out of engagement with the ratchet teeth 14 and to bring the pawls 9 into ratchetting engagement with the ratchet teeth 14. Further movement of the auxiliary member 7 to the left with respect to the intermediate member 5 is prevented by the auxiliary member 7 abutting against the flange 13.

In the above-described embodiments of the invention the intermediate member is mounted externally on the second clutch member, and the auxiliary member is mounted externally on the intermediate member. In the embodiment of the invention now to be described with reference to Figure 5, the intermediate member is carried within the second clutch member and the auxiliary member is carried within the intermediate member.

Referring to Figure 5, the second clutch member comprises an elongated sleeve 1 the inner cylindrical surface of which is formed with right-hand helical splines 15, and within the second clutch member 1 is located an intermediate member 5 formed with external right-hand helical splines 16 that engage with the splines 15 in the clutch member 1 so as to constrain the intermediate member for helical movement with respect to the clutch member 1, between axial stops 17 and 17' on the clutch member 1. The intermediate member 5 is formed at one end with a ring of radially inwardly projecting jaw clutch teeth 6. The first clutch member is a shaft 3 provided with a ring of external jaw clutch teeth 18 which in the disengaged condition of the clutch (as illustrated) are clear of the clutch teeth 6 of the intermediate member 5. The intermediate member 5 has an internal cylindrical surface formed with right-hand helical splines 19, and within the intermediate member 3 is provided an auxiliary member 7 provided with external right-hand helical splines 20 engaged with the internal splines 19 of the intermediate member 3.

The auxiliary member 7 is formed with a ring of narrow teeth 8 which, in the disengaged condition of the clutch as illustrated, project into an annular groove 13 between the clutch teeth 18 of the clutch member 3 and a ring of wide auxiliary teeth 20 on the second clutch member. At their ends adjacent the annular groove 13 the auxiliary teeth 20 are of increased height so as to provide ratchet teeth 14 that co-operate with a ring of pawls 9 carried by the auxiliary member 7. In the illustrated disengaged condition of the clutch the intermediate member 5 is adjacent to the axial stop 17, and the pawls 9 are in ratcheting relation to the ratchet teeth 14. This condition prevails so long as there is relative angular movement in one direction between the first and second clutch members.

When the direction of relative angular movement between the first and second clutch members tends to reverse, one of the pawls 9 (or for example two diametrically opposite pawls) is picked up by a ratchet tooth 14 and the auxiliary member 7 is thereby caused to move helically within the intermediate member (to the right in Figure 5) so as to bring the teeth 8 of the auxiliary member 7 into initial engagement with the ratchet teeth 14. When the teeth 8 are fully engaged with the ratchet teeth 14 the pawls 9 are out of engagement with the ratchet teeth 14, and further movement of the auxiliary member 7 to the right brings it up against a stop 21 in the intermediate member, the teeth 8 remaining engaged with the teeth 20. Thereupon the intermediate member 5 is moved helically within the clutch member 1 to initiate engagement of the clutch teeth 6 of the intermediate member 1 with the clutch teeth 18 of the clutch member 3. The interaction of the two sets of clutch teeth 6 and 18 causes the intermediate member 5 to continue its helical movement until it abuts the axial stop 17' of the clutch member 1, at which stage the clutch is fully engaged. During the helical movement of the intermediate member the auxiliary member 7 moves with it, the teeth 8 thereof continuing to be interengaged with the auxiliary teeth 20 of the clutch member 3.

Upon relative movement of the first and second clutch members in the original direction, the intermediate member 5 moves helically to the left within the clutch member 1, taking with it the auxiliary member 7, until the clutch teeth 6 of the intermediate member 5 disengage from the clutch teeth 18 of the clutch member 3 and the intermediate member 5 abuts the axial stop 17. At this stage the teeth 8 of the auxiliary member 7 are engaged with the ratchet teeth 14, and the interaction between them causes the auxiliary member 7 to move helically to the left within the intermediate member 5 until it abuts the flange 5' on which the teeth 6 are formed, this movement of the auxiliary member 7 bringing its teeth 8 out of engagement with the ratchet teeth 14 and brining the pawls 9 into ratchetting relationship with the ratchet teeth 14. The clutch is now in the originally described disengaged condition.

In a further embodiment of the invention, now to be described with reference to Figure 6, the intermediate member and the auxiliary member are both mounted directly on the second clutch member, instead of the auxiliary member being mounted on or in the intermediate member as previously described.

Referring to Figure 6, the first clutch member 1 is provided with a ring of internal jaw clutch teeth 2, and a ring of ratchet teeth 10 appreciably spaced in the axial sense from the jaw clutch teeth 2. A shaft 3 forms the second clutch member and on the shaft 3 is mounted an intermediate member 5 provided with internal right-hand splines 5' which co-operate with external helical spines 4 on the shaft 3 to constrain the intermediate member 3 for helical movement with respect to the shaft 3. The interemidate member 5 has a ring of external jaw clutch teeth 6, which in the disengaged condition of the clutch as illustrated are to one side of the jaw clutch teeth 2. Also mounted on the shaft 3 is an auxiliary member 7 formed with internal helical right-hand splines 7" which co-operate with the external splines 4 on the shaft 3 so that the auxiliary member 7 is constrained for helical movement on the shaft 3. The auxiliary member 7 comprises a sleeve having at one end a flange 23 formed with a ring of narrow teeth 8. On the side of the flange 23 nearest to the intermediate member 5 is an annular flange 24 in which are mounted a plurality of pawls 9. In the disengaged condition of the clutch the pawls 9 are as shown positioned for ratchetting with respect to the ratchet teeth 10, and the end of the auxiliary member 7 remote from the flange 23 is adjacent to an axial stop 11' on the shaft 3, the other end of the auxiliary member 7 being spaced axially from the intermediate member 3. When there is relative rotation in one direction between the first and second clutch members the pawls 9 ratchet with respect to the ratchet teeth 10, the parts of the clutch remaining, in axial sense, in the position shown.

When the direction of relative rotation between the first and second clutch members tends to reverse, a pawl 9 (or two or more pawls) is picked up by a ratchet tooth 10, causing the auxiliary member 7 to move along the shaft 3 so as to bring the teeth 8 thereof into engagement with the ratchet teeth 10 to bring the pawls 9 out of the path of the ratchet teeth 10. When the teeth 8 are fully engaged with the ratchet teeth 10 the auxiliary member 7 is in contact with the intermediate member 5. During further movement of the auxiliary member 7 (to the left in Fig. 6) caused by the interaction of the teeth 10 and 8, it pushes the intermediate member 5 along the shaft 3 sufficiently far to initiate the engagement of the clutch teeth 6 of the intermediate member 5 with the clutch teeth 2 of the clutch member 1, the teeth 8 moving through the teeth 10 until they are clear of them whereupon movement of the auxiliary member 7 ceases. Following this initial engagement of the teeth 2 and 6, the interaction of these teeth causes the intermediate member 5 to move into full toothed engagement with the clutch member 1, further movement in the same direction being prevented by an axial stop 11 on the shaft 3. The clutch is now fully engaged, the intermediate member 5 being spaced axially from the auxiliary member.

When relative motion again occurs between the first and second clutch members 1 and 3, the interaction between the two sets of clutch teeth 2 and 6 causes the clutch teeth 6 of the intermediate member 5 to disengage from the clutch teeth 2 of the first clutch member 1, the intermediate member 5 screwing along the shaft (to the right) towards and into contact with the auxiliary member 7, and then moving it into initial engagement with the teeth 10. When the intermediate member 5 has disengaged from the teeth 2 it comes to rest. The interaction of the teeth 8 of the auxiliary member 7 and the ratchet teeth 10 then causes the auxiliary member 7 to screw to the right along the shaft 3 away from the intermediate member 5 so as to disengage its teeth 8 from the ratchet teeth 10 and bring the pawls into ratchetting relation with the ratchet teeth 10, further movement of the auxiliary member 7 being prevented by the axial stop 11'.

In the two embodiments of the invention now to be described with reference to Figures 7 and 8, the intermediate member is carried by the second clutch members and the auxiliary member is carried by the first clutch member.

Referring to Figure 7, the intermediate member 5 is situated within the second clutch member 1 and is provided with external right-hand helical splines 26 that are engaged with internal right-hand helical splines 27 in the clutch member 1.

A shaft 3 forming the first clutch member is formed with external left-hand helical splines 28, and on it is mounted an auxiliary member 7 formed with internal left-hand splines 29 engaged with the splines 28 on the shaft 3. The intermediate member is provided with a ring of wide internal jaw clutch teeth 30 and with a ring of ratchet teeth 10 which are axially spaced from the clutch teeth 30, and the shaft 3 is provided with a ring of jaw clutch teeth 31 which in the disengaged condition of the clutch as illustrated are at the side of the clutch teeth 30 remote from the ratchet teeth 10. The auxiliary member 7 carries a ring of pawls 9, and is formed with a ring of narrow teeth 8 at the side of the pawls 9 remote from the clutch teeth 30 of the intermediate member, and an abutment flange 32 which is at the side of the pawls 9 nearest to the clutch teeth 30. In the disengaged condition of the clutch as shown the pawls 9 are in ratchetting position in relation to the ratchet teeth 10 and the auxiliary member 7 is adjacent to the axial stop 33 on the shaft 3. While there is relative angular movement between the first and second clutch members the pawls 9 ratchet with respect to the ratchet teeth 10.

When the direction of relative angular movement tends to reverse, a pawl 9 is picked up by a ratchet tooth 10 and the auxiliary member 7 is moved helically to the left in Fig. 7 so as to bring its teeth 8 into engagement with the ratchet teeth 10. When the teeth 8 are fully engaged, the abutment flange 32 contacts the intermediate member 5, and then shifts it to the left sufficiently to initiate engagement of the clutch teeth 30 with clutch teeth 31. This latter movement takes place with the teeth 8 remaining in full engagement with the ratchet teeth 10 since they are somewhat wider than the ratchet teeth 10. When clutch engagement has been initiated, the interaction between the clutch teeth 30 and 31 moves the intermediate member 5 into the fully engaged position, further movement thereof being prevented by an axial stop 24 of the clutch member 1.

Referring now to Figure 8, the jaw clutch teeth 36 of the intermediate member 5 are also used as ratchet teeth. The intermediate member 5 is situated within the second clutch member 1 and is provided with external right-hand helical splines 37 engaged with internal right-hand helical splines 38 in the clutch member 1. A shaft 3 forming the first clutch member is provided with external left-hand helical splines 39, and on the shaft 3 is mounted an auxiliary member 7 formed with internal left-hand helical splines 40 engaged with the splines 39 on the shaft 3. In the disengaged condition of the clutch as shown, the clutch teeth 36 of the intermediate member 5 are, in the axial sense, between the clutch teeth 41 of the shaft 3 and a ring of narrow teeth 8 on the auxiliary member 7. A ring of pawls 9 is in ratchetting relationship with the clutch teeth 36 of the clutch member 1.

When the direction of relative rotation of the first and second clutch members tends to reverse, a pawl 9 is picked up by a tooth 36 of the intermediate member 5 and the auxiliary member 7 is thereby shifted so as to initiate engagement of its teeth 8 with the clutch teeth 36 of the intermediate member 5. The teeth 8 thereupon move into full engagement with the clutch teeth 36, whereupon further movement of the auxiliary member 7 is prevented by a stop 42 and the interaction of the teeth 8 and the jaw clutch teeth 36 causes the intermediate member 5 to move to the left to initiate engagement of its clutch teeth 36 with the clutch teeth 41. The interaction of these two sets of jaw clutch teeth 36 and 41 then causes the intermediate member 5 to be screwed into full toothed engagement with the clutch member 3 and out of toothed engagement with the teeth 8 and the pawls 9. Further axial movement of the intermediate member 5 is limited by the axial stop 34. When relative movement again occurs between the first and second clutch members, the intermediate member 5 screws back to its original axial position, during which movement the clutch teeth 36 engage with the teeth 8. When the teeth 36 are clear of the clutch teeth 41 the interaction between the clutch teeth 36 and the teeth 8 causes the auxiliary member 7 to screw back into the position in which the teeth 8 are disengaged from the clutch teeth 36 and the pawls 9 are in ratchetting relation with the clutch teeth 36.

I claim:

1. A clutch comprising coaxially mounted first and second clutch members the first of which is provided with jaw clutch teeth, an intermediate member provided with jaw clutch teeth, means constraining said intermediate member for helical movement relative to said second clutch member whereby to bring the clutch teeth of said intermediate member into and out of toothed engagement with the clutch teeth of said first clutch member, an auxiliary member for initiating the toothed engagement of said intermediate member with said first clutch member, means constraining said auxiliary member for limited helical movement relative to one member of the aforesaid members, namely: the intermediate member, the first clutch member and the second clutch member, and a ratchet mechanism associated with said auxiliary member for initiating the helical movement of the auxiliary member to initiate said toothed engagement of said intermediate member and said first clutch member, said ratchet mechanism comprising at least one pawl mounted for movement of the pawl nose in a plane radial to the clutch axis.

2. A clutch according to claim 1 wherein said intermediate member is mounted externally on said second clutch member and said auxiliary member is mounted externally on said intermediate member, and said ratchet mechanism comprises at least one pawl carried by said auxiliary member and ratchet teeth carried by said first clutch member.

3. A clutch according to claim 1 wherein said intermediate member is mounted within said second clutch member and said auxiliary member is mounted within said intermediate member, and said ratchet mechanism comprises at least one pawl carried by said auxiliary member and ratchet teeth carried by said first clutch member.

4. A clutch according to claim 1 wherein said intermediate and auxiliary members are both mounted externally on said second clutch member and said ratchet mechanism comprises at least one pawl carried by said auxiliary member and ratchet teeth carried by said first clutch member.

5. A clutch according to claim 1 wherein said intermediate member is mounted within said second clutch member and said auxiliary member is mounted externally on said first clutch member, and said ratchet mechanism comprises at least one pawl carried by said auxiliary member and ratchet teeth carried by said second clutch member.

6. A clutch according to claim 1 wherein said intermediate member is mounted within said second clutch member and said auxiliary member is mounted externally on said first clutch member, and said ratchet mechanism comprises at least one pawl and ratchet teeth that are constituted by the clutch teeth of said intermediate member.

7. A clutch according to claim 1 wherein said auxiliary member has teeth which, under an appropriate condition of relative rotation of said first and second clutch members, are caused by said ratchet mechanism to interact with the teeth with which said pawl co-operates to initiate the interengagement of the clutch teeth of said first clutch member and said intermediate member.

8. A clutch according to claim 1 wherein said auxiliary member has teeth adapted to be placed into and out of toothed engagement with the teeth on said first clutch member, said last-mentioned teeth being of a sufficient width to insure continuous engagement between said teeth on said auxiliary member and said teeth on the first clutch member, following the operation of said ratchet mechanism, up to full clutch engagement.

9. A clutch comprising coaxially mounted first and second clutch members the first of which is provided with jaw clutch teeth, an intermediate member provided with jaw clutch teeth, means constraining said intermediate member for helical movement relative to said second clutch member whereby to bring the clutch teeth of said intermediate member into and out of toothed engagement with the clutch teeth of said first clutch member, an auxiliary member for initiating the toothed engagement of said intermediate member with said first clutch member, means constraining said auxiliary member for limited helical movement relative to said first clutch member, and a ratchet mechanism associated with said auxiliary member for initiating the helical movement of the auxiliary member to initiate said toothed engagement of said intermediate member and said first clutch member, said ratchet mechanism comprising at least one pawl mounted for movement of the pawl nose in a plane radial to the clutch axis.

10. A clutch comprising coaxially mounted first and second clutch members the first of which is provided with jaw clutch teeth, an intermediate member provided with jaw clutch teeth, means constraining said intermediate member for helical movement relative to said second clutch member whereby to bring the clutch teeth of said intermediate member into and out of toothed engagement with the clutch teeth of said first clutch member, an auxiliary member for initiating the toothed engagement of said intermediate member with said first clutch member, means constraining said auxiliary member for limited helical movement relative to said second clutch member, and a ratchet mechanism associated with said auxiliary member for initiating the helical movement of the auxiliary member to initiate said toothed engagement of said intermediate member and said first clutch member, said ratchet mechanism comprising at least one pawl mounted for movement of the pawl nose in a plane radial to the clutch axis.

References Cited in the file of this patent

UNITED STATES PATENTS

| 2,258,475 | Sinclair | Oct. 7, 1941 |

FOREIGN PATENTS

| 71,865 | Sweden | May 19, 1931 |
| 539,234 | Italy | Feb. 8, 1956 |
| 1,135,871 | France | Dec. 22, 1956 |